Patented Oct. 29, 1946

2,410,024

UNITED STATES PATENT OFFICE 2,410,024

PRODUCTION OF ISOBUTANE AND THE LIKE HYDROCARBONS

Eric William Musther Fawcett and John Henry Beynon, Sunbury-on-Thames, England, assignors to Anglo-Iranian Oil Company Limited, London, England, a British joint-stock corporation No Drawing. Application October 8, 1941, Serial No. 414,138. In Great Britain October 2, 1940

5 Claims. (Cl. 260—683.5)

It is known that normal aliphatic hydrocarbons such as n-butane or n-pentane can be converted into substantial proportions of branched chain hydrocarbons such as isobutane or isopentane by contacting the normal hydrocarbons with a catalyst comprising an anhydrous aluminium halide, notably aluminium chloride.

The applicants have found that the reaction can be carried out in either the homogeneous system or the heterogeneous system and that it is advantageous to work in the homogeneous system as thereby the production of by-products is less than in the heterogeneous system when operating under the same temperature conditions. When using aluminium chloride as the catalyst the reaction rate obtainable in the homogeneous system is, however, limited by the comparatively low solubility of aluminium chloride in the normal hydrocarbons (about 2% by weight in the case of n-butane) since the reaction rate increases continuously as the proportion of catalyst present is increased, at least over the range 0–10% by weight of aluminium chloride to butane.

The applicants have now found that this disadvantage may be overcome by carrying out the reaction in the presence of a liquid which has good solvent powers both for aluminium chloride and for hydrocarbons and which does not form stable addition compounds with the aluminum chloride. According to the present invention therefore a mixture of normal hydrocarbon and a suitable solvent, which has good solvent powers both for aluminum halide and for hydrocarbons and which does not form stable addition compounds with the aluminium halide and of which carbon disulphide and tetrachloroethane are typical, is treated with a proportion of aluminium chloride not exceeding that for a saturated solution in the reaction mixture at the reaction temperature. The reaction is normally carried out at elevated temperatures, generally in the range 50–200° C., and under such pressure as is necessary to maintain the liquid phase.

The reaction may advantageously be carried out in the presence of a proportion of hydrogen chloride but generally not exceeding 10% by weight of the hydrocarbon.

The process may be carried out either as a batch or a continuous operation, and in either case the product after reaction is fractionated usually by distillation, to separate the desired product, i. e. the isoparaffin from the unreacted normal hydrocarbon, the solvent and the catalyst, which may be returned to the process for further treatment together with further quantities of normal hydrocarbons.

Solvents such as nitrobenzene which form stable addition compounds with aluminium chloride are not suitable for use in the process of the present invention.

The following examples illustrate process conditions and the beneficial effects secured.

*Example 1.*—A mixture of dry n-butane (120 g.) and aluminium chloride (10 g.) in dry tetrachloroethane (40 c. c.) was maintained at 100° C. for 24 hours in a steel bomb. The gaseous product contained 48.6% isobutane and 51.4% n-butane. The same proportions of n-butane and aluminium chloride in the absence of tetrachloroethane under otherwise identical conditions yielded a product containing 39.0% isobutane, 60% n-butane and 1% butenes.

*Example 2.*—A mixture of dry n-butane (100 g.), aluminium chloride (12 g.) and purified carbon disulphide (100 c. c.) containing 0.35 g. hydrogen chloride, was maintained at 100° C. for 24 hours in a steel bomb. The hydrocarbon fraction of the product contained 25.6% isobutane, 72.5% n-butane and 1.9% of lower hydrocarbons.

The following example demonstrates that the use of solvents such as nitrobenzene inhibit the reaction.

*Example 3.*—A mixture of n-butane (116 g.), aluminium chloride (13.35 g.) and nitrobenzene (25 c. c.) was maintained for 24 hours at 100° C. in a steel bomb. The n-butane was recovered unchanged.

We claim:

1. A process for the conversion of n-butane into substantial proportions of iso-butane comprising contacting n-butane in the liquid phase at a temperature in the order of 100° C. with an aluminium halide catalyst in the presence of tetrachloroethane, the quantity of catalyst being in the order of 10% by weight of the n-butane and the quantity of tetrachloroethane being in the order of 50% by weight of the n-butane.

2. A process for the catalytic conversion of normal aliphatic hydrocarbons into substantial proportions of the corresponding branched chain hydrocarbons comprising dissolving an aliphatic hydrocarbon feedstock and aluminium halide catalyst in tetrachloroethane, and reacting the solution at an elevated temperature and under such pressure as is necessary to maintain the solution in the liquid phase, to form the desired branched chain hydrocarbons.

3. A process for the conversion of normal aliphatic hydrocarbons into substantial proportions of the corresponding branched chain hydrocarbons as set forth in claim 2, in which aluminium chloride is used as catalyst and an hydrogen halide is used as catalytic promoter.

4. A process for the conversion of normal aliphatic hydrocarbons into substantial proportions of the corresponding branched chain hydrocarbons as set forth in claim 2, in which the aluminium halide is present in an amount exceeding that required for a saturated solution in the hydrocarbons but not exceeding that for a saturated solution in the reaction mixture at the reaction temperature.

5. The process of claim 2 in which aluminium chloride is used as catalyst.

ERIC WILLIAM MUSTHER FAWCETT.
JOHN HENRY BEYNON.